(12) United States Patent
Diederiks et al.

(10) Patent No.: US 7,861,187 B2
(45) Date of Patent: Dec. 28, 2010

(54) USER INTERFACE TO SUPPORT A USER SELECTING CONTENT

(75) Inventors: Elmo Marcus Attila Diederiks, Eindhoven (NL); Bartel Marinus Van De Sluis, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 658 days.

(21) Appl. No.: 11/908,985

(22) PCT Filed: Mar. 21, 2006

(86) PCT No.: PCT/IB2006/050868
§ 371 (c)(1),
(2), (4) Date: Sep. 18, 2007

(87) PCT Pub. No.: WO2006/100642
PCT Pub. Date: Sep. 28, 2006

(65) Prior Publication Data
US 2008/0189629 A1 Aug. 7, 2008

Related U.S. Application Data

(60) Provisional application No. 60/665,024, filed on Mar. 24, 2005.

(51) Int. Cl.
*G06F 3/048* (2006.01)
(52) U.S. Cl. .................. 715/860; 715/862; 715/764; 715/845; 715/846; 715/823; 715/770

(58) Field of Classification Search .................. 715/862, 715/860, 845, 846, 702, 823, 770; 345/173
See application file for complete search history.

(56) References Cited

U.S. PATENT DOCUMENTS

| 5,119,079 | A | 6/1992 | Hube et al. |
| 5,594,847 | A | 1/1997 | Moursund |
| 5,757,358 | A * | 5/1998 | Osga .......................... 715/862 |
| 5,877,750 | A | 3/1999 | Hanson |
| 6,476,823 | B1 | 11/2002 | Gardner |
| 2002/0075333 | A1 | 6/2002 | Dutta et al. |

OTHER PUBLICATIONS

Raisamo Roope, A Multimodal User Interface for Public Information Kiosks, Jan. 1998.*

* cited by examiner

*Primary Examiner*—Tadeese Hailu
*Assistant Examiner*—Nicholas S Ulrich

(57) ABSTRACT

A user interface provides a representation of content items that are selected based on a duration of time of a selection action of the content items if the duration of time of the selection action exceeds a given time interval. An association between a plurality of content items may be used to determine the growth of the selection indication including at least one of a rate of growth, a shape of growth, and the time interval prior to growth of the selection indication. A system may sense at least one of a proximity of a content items to a selected content item and an association between content items, and grows the selection indication at a rate and/or shape and/or other representation that is determined by the proximity and/or association.

17 Claims, 9 Drawing Sheets

USER INTERFACE TO SUPPORT A USER SELECTING CONTENT

This specification relates to a user interface to assist a user to select content.

There are many user interface systems to assist a user in selecting items, such as from a visually presented set or list of items. For example, there are systems that enable a user to select files within a graphical user interface. The most typical is a mouse that is utilized with a corresponding cursor such as a selection arrow. Moving a mouse around on a flat surface or in three-dimensional space, moves the corresponding cursor around within a graphical user interface. Items shown on the graphical user interface are selectable by manipulating the mouse to place the cursor over the item and thereafter, depressing a button on the mouse or other input device, such as a computer keyboard. When it is desired to select multiple items, the button may be depressed and remain depressed while the mouse is manipulated (dragged) from a first selected item to one or more subsequent items. Dragging the mouse with the selection button depressed may have the effect of selecting each of the first and subsequent items.

In another embodiment, the button may be depressed together with another key combination (e.g., a SHIFT or CTRL key on the computer keyboard) to select a first and one or more subsequent items. For example, if it is desired to select five items that follow each other in a list, one may select the first item by manipulating the mouse to place the cursor over the item and depressing and releasing a selection button (e.g., a left button on the mouse). Subsequently, the second through fifth item may also be selected by manipulating the mouse to place the cursor over the fifth item and then depressing and holding down the SHIFT key followed by depressing the left mouse button again. After the second depression of the mouse button, both the SHIFT key and the mouse button may be released. Each of the first through fifth items will remain selected. Other systems allow a similar selection scheme but use a touch sensitive screen and an input device such as a stylus or a finger instead of a mouse and corresponding cursor. In either event, these systems are cumbersome in that multiple selection actions are required.

In another known system, the cursor defines a region of selection that surrounds the cursor, such as a circular region surrounding the cursor. Such a system is described in U.S. Patent Publication No. US 2002/0075333 A1, hereinafter referred to as the '333 Patent Publication, which is incorporated by reference as if set out in entirety herein. The '333 Patent Publication describes a further embodiment wherein items are selected by moving the cursor in the direction of the item. Like the other above described system, a selection of multiple items still requires multiple selection actions.

In yet another system, the cursor defines a selection ruler that extends either across or down the graphical user interface. Depression of a mouse button causes all items that are positioned either directing across or down from the cursor position to be selected. Such a system is described in U.S. Pat. No. 5,594,847, hereinafter referred to as the '847 patent, which is incorporated by reference as if set out in entirety herein. The '847 patent however does not have a flexible selection field (only horizontally across or vertically down).

U.S. Pat. No. 5,877,750, hereinafter referred to as the '750 patent, which is incorporated by reference as if set out in entirety herein, describes a method for selecting a line width in a graphics application wherein the line width expands like an ink-spill when a first event is performed and continued. When the event is not longer continued, the then current size of the ink spill defines a line width that can be subsequently utilized for operation within the graphics application. While this system does enable one to readily change/define the width of a drawing line, it does not help a user in item selection.

Accordingly, it is an object of the present invention to overcome these disadvantages and/or others of the prior art.

The present system includes devices, methods, program portions, user interfaces, etc. for producing a representation of content items that are selected based on a duration of time of a selection action of the content items. In operation, a selection indication is grown if the duration of time of the selection action exceeds a given time interval. In one embodiment, an association between a plurality of content items is used to determine the growth of the selection indication including at least one of a rate of growth, a shape of growth, and the time interval prior to growth of the selection indication.

In another embodiment, the system senses at least one of a proximity of a content items to a selected content item and an association between content items, and grows the selection indication at a rate and/or shape that is determined by the proximity and/or association. The system may reposition content items to be in close spatial proximity based on an association between selected content items.

The following are descriptions of illustrative embodiments that when taken in conjunction with the following drawings will demonstrate the above noted features and advantages, as well as further ones. In the following description, for purposes of explanation rather than limitation, specific details are set forth such as the particular architecture, interfaces, techniques, etc., for illustration. However, it will be apparent to those skilled in the art that other embodiments that depart from these specific details would still be understood to be within the scope of the appended claims. Moreover, for the purpose of clarity, detailed descriptions of well-known devices, circuits, and methods are omitted so as not to obscure the description of the present invention.

It should be expressly understood that the drawings are included for illustrative purposes and do not represent the scope of the present invention. In the figures, like parts of the system are denoted with like numbers.

The invention is best understood in conjunction with the accompanying drawings in which.

For illustrative purposes and to simplify the following discussion, the present system will be described below with regard to illustrative user interfaces and systems to facilitate the description. The present system and method is applicable to other user interfaces and systems, without limitation. For example, the discussion and figures show a graphical user interface, for as example as may be shown on a personal computer system using a Windows™ operating system, such as available by Microsoft™ Corporation. However, as would be readily apparent, the system and method described and claimed here would be applicable to other types of display devices and/or using other types of user interfaces, without limitation, such as a personal digital assistant (PDA); a consumer electronics user interface such as found on a television display, an audio component display, a home media hub component, etc.

Further, this system and method is applicable to other display types such as three-dimensional display devices wherein a three-dimensional image is projected (apparently or otherwise) onto a three-dimensional space. Further, the present system is described referring to displayed items. Items should be understood to include, without limitation, content items represented by file lists such as may be shown within a directory listing from a local and/or remote storage medium showing. For example, the items may be represented by file names of audio and/or visual content that is stored on a local storage medium, such as may be stored on a personal audio/visual playing device. Content items may also be represented by iconic symbols such as an image representation of the content item or other means of providing a user with an indication of content items.

Figure 1:
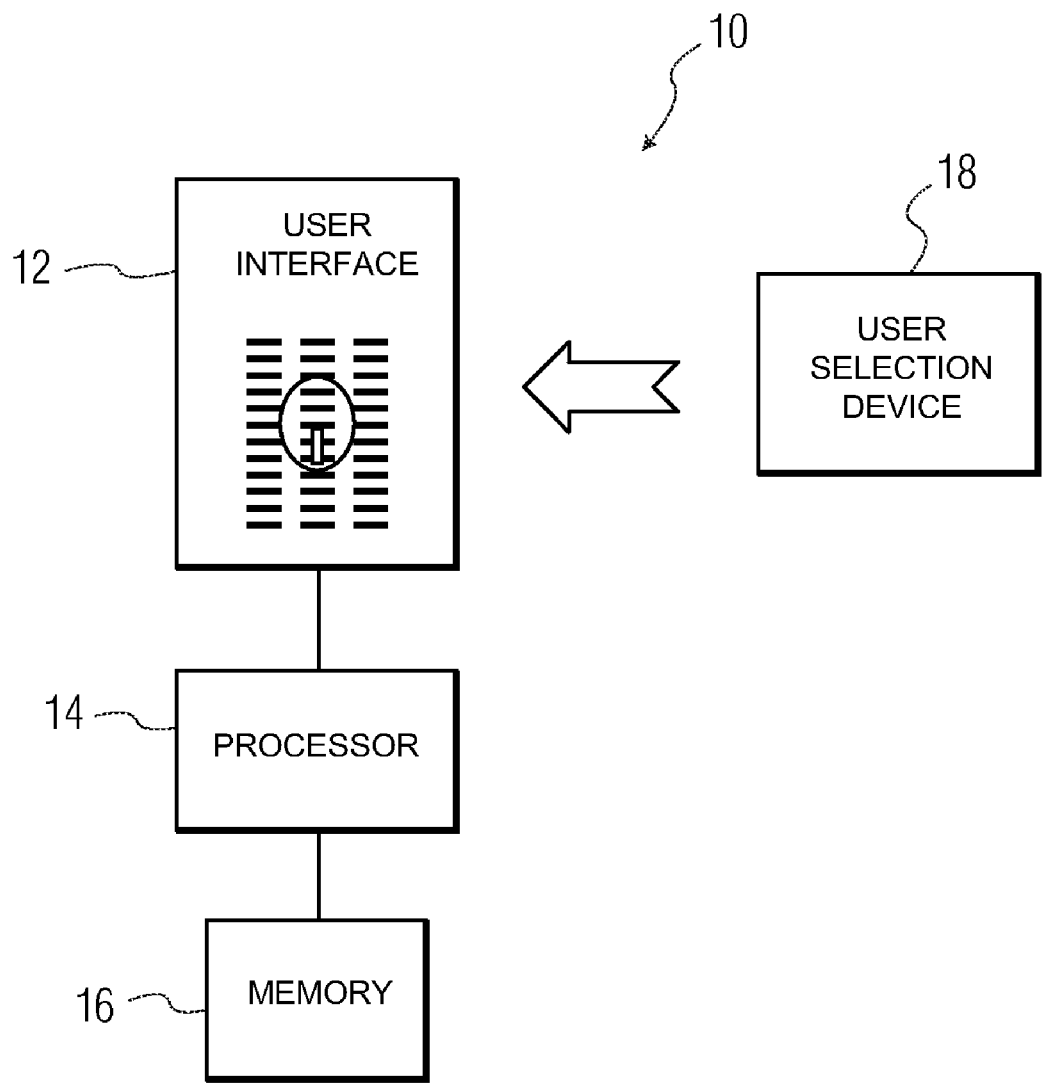
FIG. 1 shows an illustrative selection system in accordance with an embodiment of the current system.

FIG. 1 illustrates a system 10 in accordance with an embodiment of the present system. The system 10 has a processor 14, a storage device in the form of a non-transitory computer-readable medium, such as a memory 16, a user selection device 18, and a user interface display device 12, all shown operably coupled together. The term operably coupled together is intended to mean any system of connecting the portions together so that operation in accordance with the present system is enabled. The processor 14 runs program instructions to provide the user interface 12 and to receive a user selection from the user selection device 18. The program instructions are stored in the memory 16 which is shown separate from the processor 14, although this clearly is not required as the processor 14 may be a dedicated processor that is hard-wired to perform instructions as described.

The user selection device 18 may be any suitable input device for interacting with a given user interface. For example and without limitation, the user selection device 18 may be a computer mouse, a remote control device, a general purpose or dedicated stylus device, an input button, such as an OK button on a user device, a joystick, a jog-dial, a touch pad, navigation button, and/or even a finger or other probe of a user. The user selection device 18 interacts with the user interface 12 and the processor 14 to produce a selection activation of items displayed. Further, the processor 14 determines a start time of selection activation and a duration of selection activation.

Figure 1A:
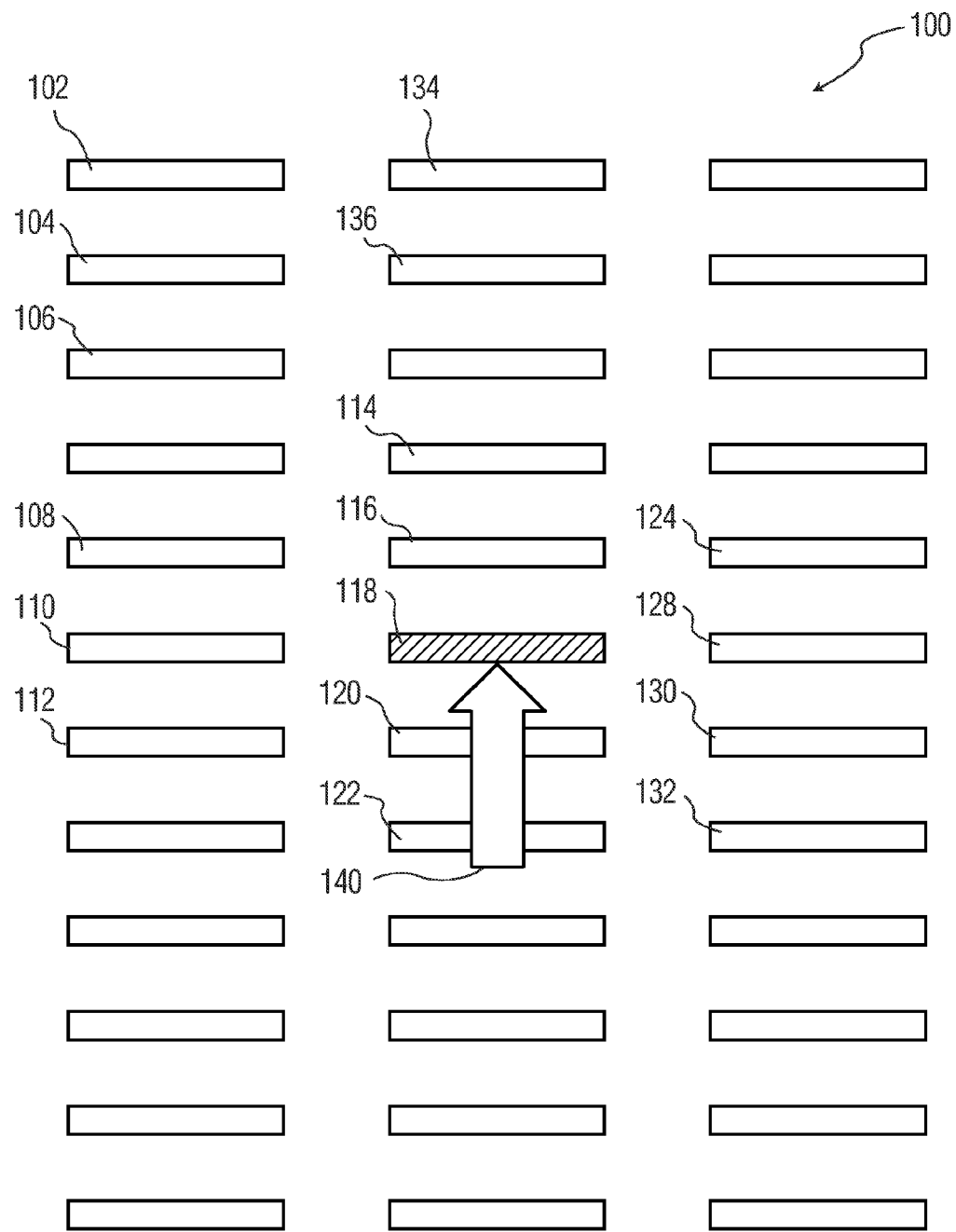
FIGS. 1A, 1B, 1C illustrate operation of a selection system in accordance with an embodiment of the current system.
Figure 1B:
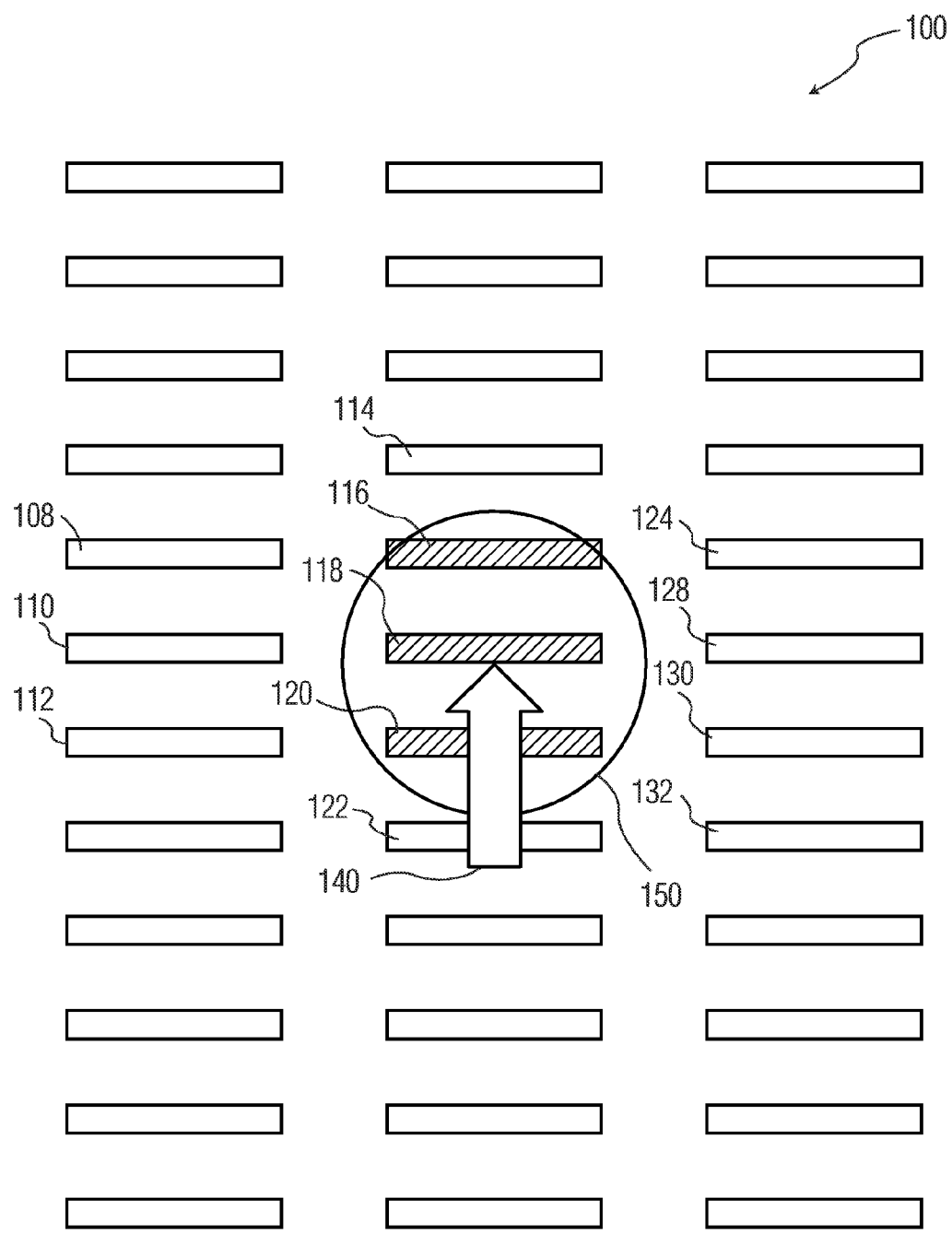
Figure 1C:
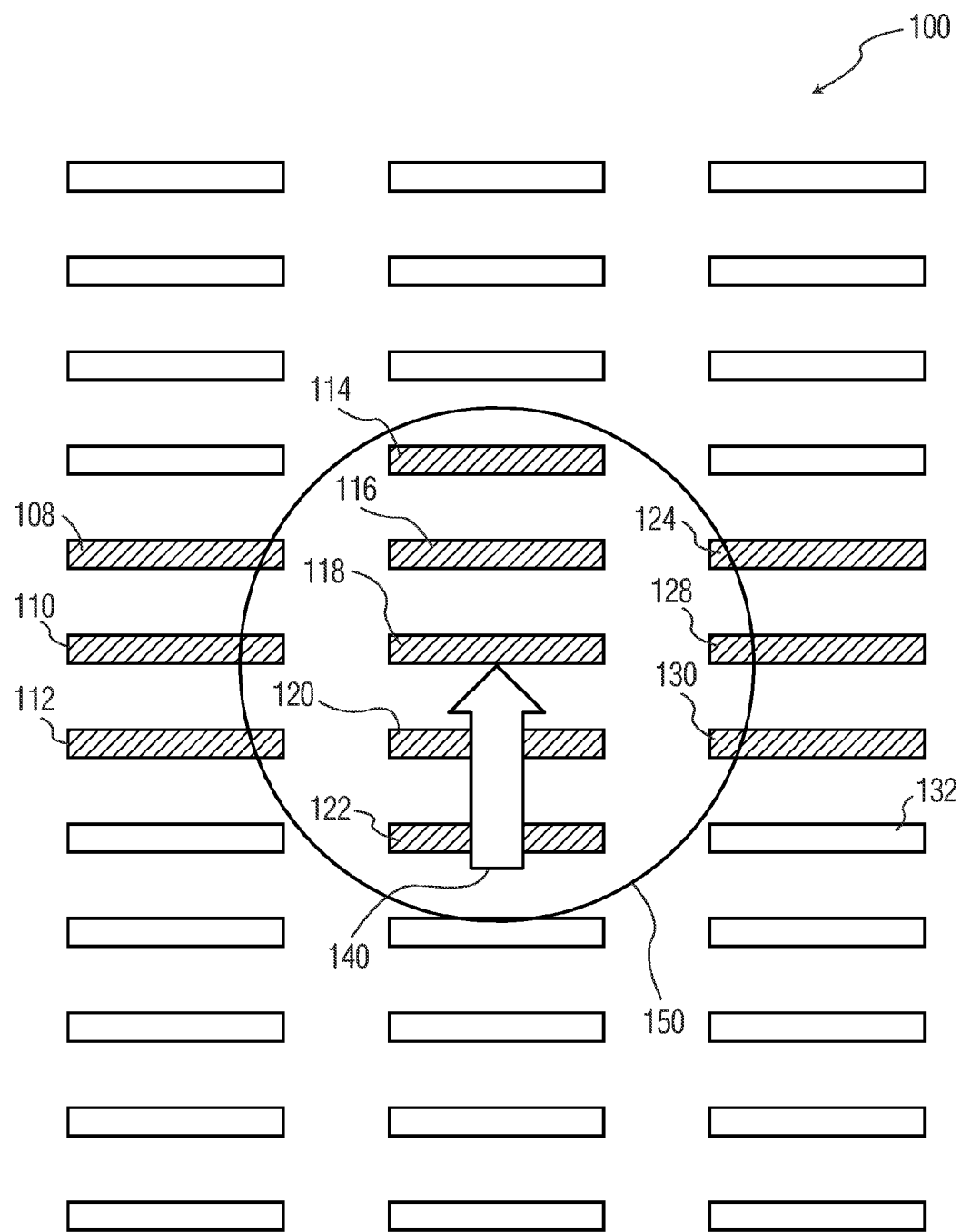
Figure 3:
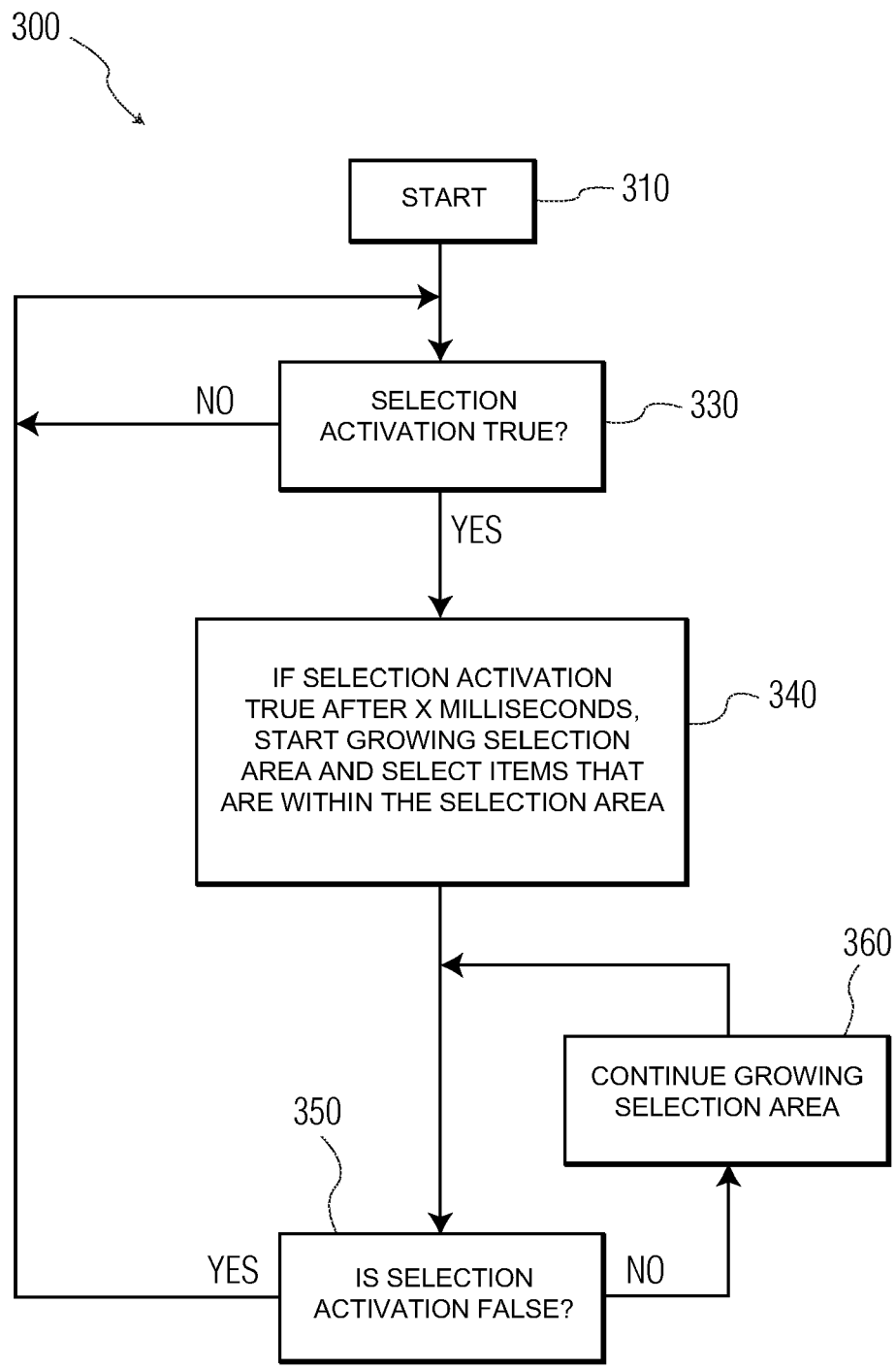
FIG. 3 shows a flow diagram illustrating operation of a selection system in accordance with an embodiment of the current system.

Further operation will be illustrated with reference to FIGS. 1A, 1B, 1C, 3 and previously discussed FIG. 1. FIGS. 1A, 1B, and 1C show a display of a two-dimensional user interface 100 operating in accordance with an embodiment of the present system. FIG. 3 shows a flow diagram 300 of an illustrative embodiment.

As shown, the user interface 100 has numerous content items displayed including content items 102, 104, 106, 108, 110, 112, 114, 116, 118, 120, 122, 124, 128, 130, 134, 136 and others. Further, a cursor 140 is shown that as previously described, is operatively coupled to the user selection device 18 by suitably programming (enabling) the processor 14, such that the user selection device 18 may manipulate a position of the cursor 140 within the user interface 100. Further, the processor 14 is enabled to detect a position of the cursor 140 within the user interface 100 generally, and with relation to the content items displayed on the user interface 100. The processor 14 is further enabled to detect when a selection is activated (for example, activation may be initiated by depression of a button on the user selection device, by manipulation of an OK button or a joystick on a mobile phone, etc.), when a selection is deactivated, and the duration of selection activation.

FIG. 3 shows a process 300 in accordance with an embodiment that is started during act 310 when the above-described operation is enabled. The user may manipulate the cursor 140 within the user interface 100 until the cursor is manipulated to enable selection of a desired content item, such as content item 118.

During act 330, selection of the content item 118 is detected, if not true, act 330 is repeated until true as shown. When selection activation is true, the processor 14 may alter a display characteristic of the content item 118 as an indication of selection as shown for content item 118. The processor 14 also starts a counter indicating a duration of selection activation. A time X milliseconds after selection activation starts, a selection area 150 begins to grow originating in the area of the content item 118 and/or the cursor 140 during act 340 as shown in FIG. 1B. Content items that are within the selection area 150 are also selected, such as content items 116 and 120. As long as selection activation is true, the selection area 150 will continue to grow as shown in FIG. 1C wherein content items 108, 110, 112, 114, 122, 124, 128, and 130 are also shown selected as well as previously selected content items 116, 118, 120.

In the event that the selection activation is discontinued some time after X milliseconds or is not maintained for X milliseconds, then the growth of the selection area terminates or is not initiated as determined by act 350 and the process returns to act 330 awaiting the selection activation. When the section activation is true during act 350, the selection area continues to grow during act 360.

Within the system 10, the duration of selection activation (e.g., number of milliseconds) before the selection area 150 starts growing may be some predetermined time, such as some time in the range of 300-2000 milliseconds, although other times may be suitably used. In selecting a predetermined time, some considerations that may be utilized include that the time is not too long since this may disturb the user's comfort and the intuitiveness of the interaction, and that the time is not too short since this may interfere with a single selection action. In other embodiments, the duration of selection activation before the selection area 150 starts growing may vary, such as when some content items are placed closer together within the user interface, when the content items are closer or further from the cursor position and/or based on a relational characteristic of the content items, the selection area may begin growing to include content items in a longer or shorter duration.

In another embodiment, the selection area may grow in a direction that is unbounded by an outside edge of the user interface. For example, in FIG. 1A, if content item 102 were the first item selected during act 330, then the selection area might grow outward towards contents items 104, 134. The processor might control this outward growth in response, to information related to the outside edges of the user interface as well as based on other characteristics as discussed in regard to other embodiments.

In addition, the speed that the selection area 150 grows at may vary, such as when some content items are placed closer together within the user interface or are placed closer to an outside edge of the selection area. In this case, the selection area may grow faster or slower to include those closer content items than when encompassing content items that are further apart or are further from the outside edge of the selection area. Further, the speed of growth of the selection area may grow and/or vary based on relational characteristics of the content items. For example, the selection area may grow faster or slower when content items are closely related in some characteristic, such as a visual characteristic(s) and/or other association(s) between the various content items. For example, content items may be ordered based on name, date, size, etc., and these associations may affect the speed of growth, as well as affect the duration for selection activation and/or the direction of growth.

FIGS. 2A, 2B, 2C, 2D show a further user interface illustrating operation in accordance with another embodiment. FIGS. 2A, 2B, 2C, 2D show a user interface for a content management system wherein content items are presented as associated content in a mind map presentation wherein content items are visually presented such as to provide a visual indication of a degree of association between content items, such as spatial ordering. For example, in a spatially ordered mind map presentation, closely associated content items are positioned in close spatial proximity. The advantage of such a presentation of content items is that associated content items may be easily found because the relationship/association between content items is related to the displayed spatial proximity of content items. A mind map presentation may be provided, for example, as a search result in response to a search for image content items similar to a given image content item or may be created just too to visually identify characteristic relationships between the content items of the mind map.

For example, if an image of a city such as New York City is utilized as a search image, a request that an image search engine provide search results of other images will provide results similar to the search image. In returning results, the image search engine might provide a display resembling FIG. 2A, wherein content item 210 may represent the search image. Content items 212, 214, 216 may be other images of New York City or very close visual equivalents to the search image. Content items 228, 226, 234 may be images of other large cities having similar visual characteristics, such as skyscrapers, etc. Content item 230 that is positioned furthest from the search image, would be an image that has little resemblance to the search image and may for example be an image of a rural town that only has small buildings.

It should be expressly understood that while image characteristics are utilized herein as an example of an association between content items, numerous alternate associations may exist between given content items and/or between different groups of content items. It is intended that the term associated content items and similar references herein include, without limitation, items that are associated merely by a physical proximity as displayed within a user interface and/or items that are associated by some characteristic or feature of the content items. For example, content items may be associated based on time of creation/acquisition of the content items, type characterization of content items (e.g., pictures, audio, etc.), visual elements of content items generally such as evening images or particular content item features, such as pictures/audio/other content items related to a particular geographic location, etc.

Further, a closeness of association between content items may be characterized by more than one content item feature or characteristic. For example, all content items created on a given date may have one association characteristic that is the same for all those given content items presuming that the granularity of this characteristic where only to the date and not to a time of creation, etc. However individual content items may have other similar or dissimilar associations, such as night and day images. Accordingly, the association between a subset of content items of this given group may be closer than to another subset of this given group.

Numerous alternate types of content associations would occur to a person of ordinary skill in the art. For example, U.S. Patent Application Nos. 60/632,135 and 60/632,134, which are commonly assigned and incorporated by reference as if set out in entirety herein, describe a method to use content descriptors or meta-data as dimensions, along which the similarity between content items is determined. Based on this similarity between content items and a similarity threshold value it may be decided whether content is associated/similar to content that is currently selected by the user. U.S. Patent Application No. 60/632,137, which is commonly assigned and incorporated by reference as if set out in entirety herein, describes a method to adapt the similarity threshold depending on the location of creation compared to a current location or a location where the user is present, for example, a majority of the time (e.g., home). U.S. Patent Application No. 60/632, 136, which is commonly assigned and incorporated by reference as if set out in entirety herein, describes a method to adapt the similarity threshold depending on the time of creation compared to a current point in time. Each of the above alternate types of determined associations and other suitable mechanisms of content association should be understood to be within the scope of the term "associated" generally, and particularly within the scope of the appended claims. In any event and regardless of how content item associations are determined, operation in accordance with the present system is intended.

Figure 2A:
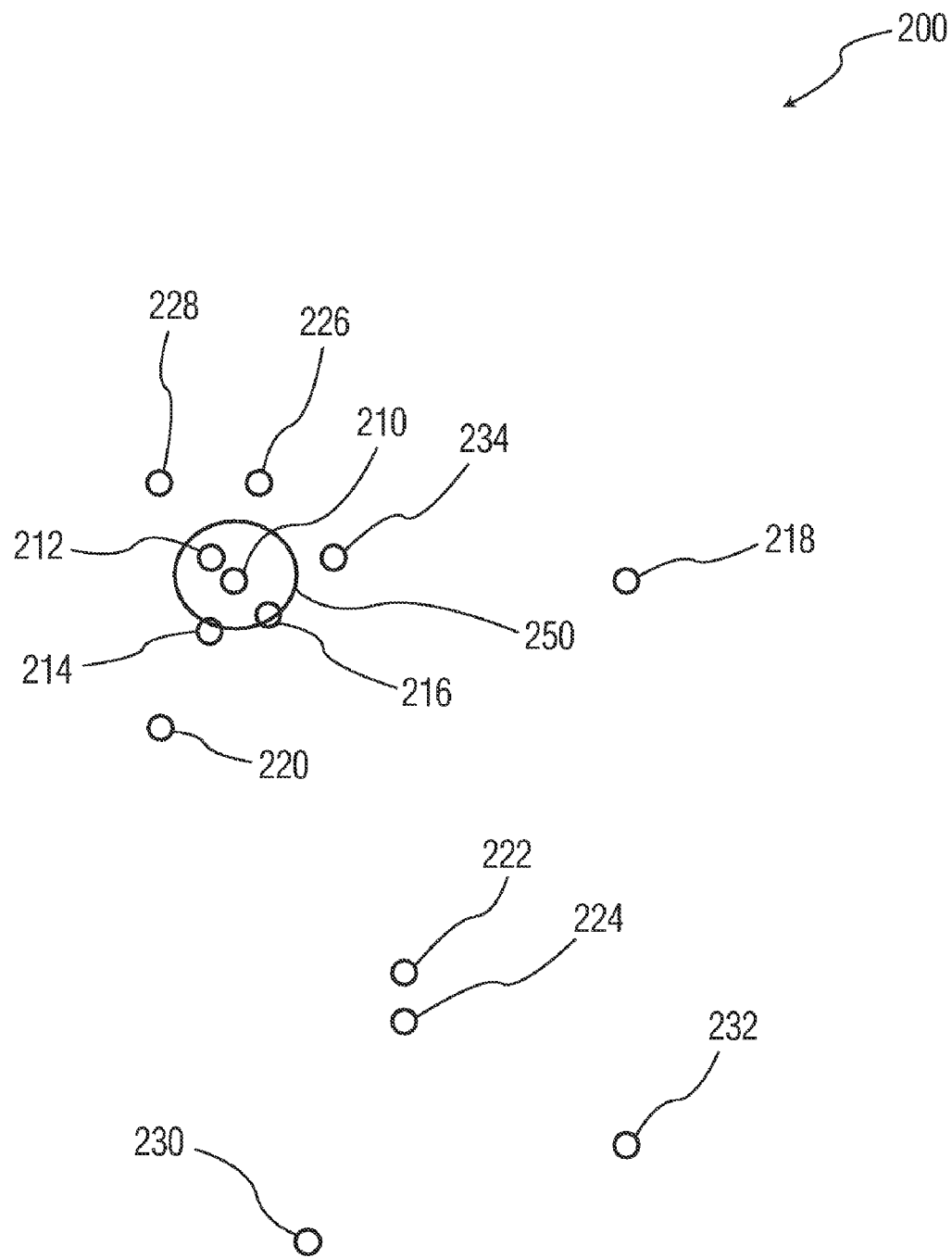
FIGS. 2A, 2B, 2C, 2D illustrate operation of a selection system in accordance with an embodiment of the current system.
Figure 2B:
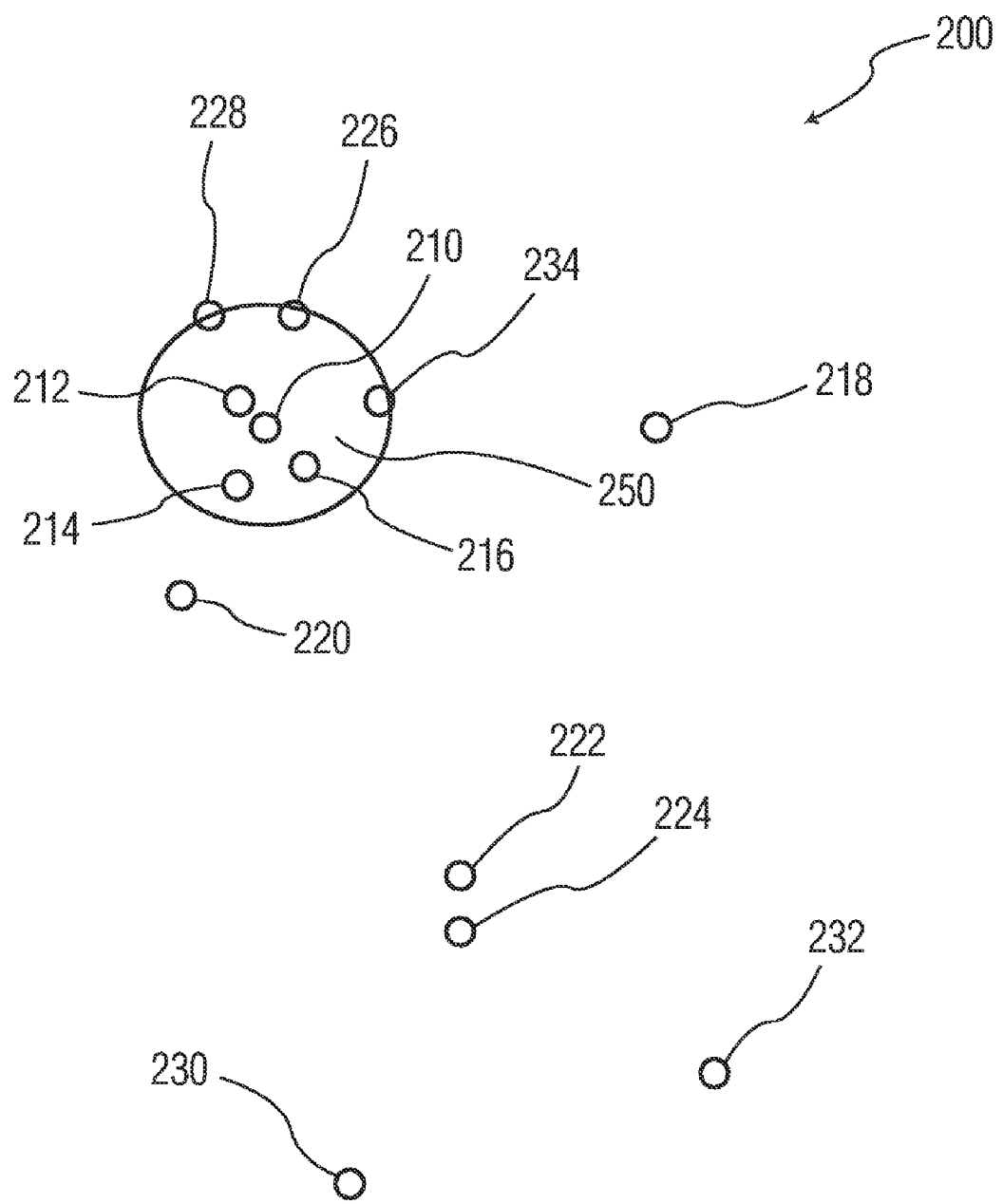
Figure 2C:
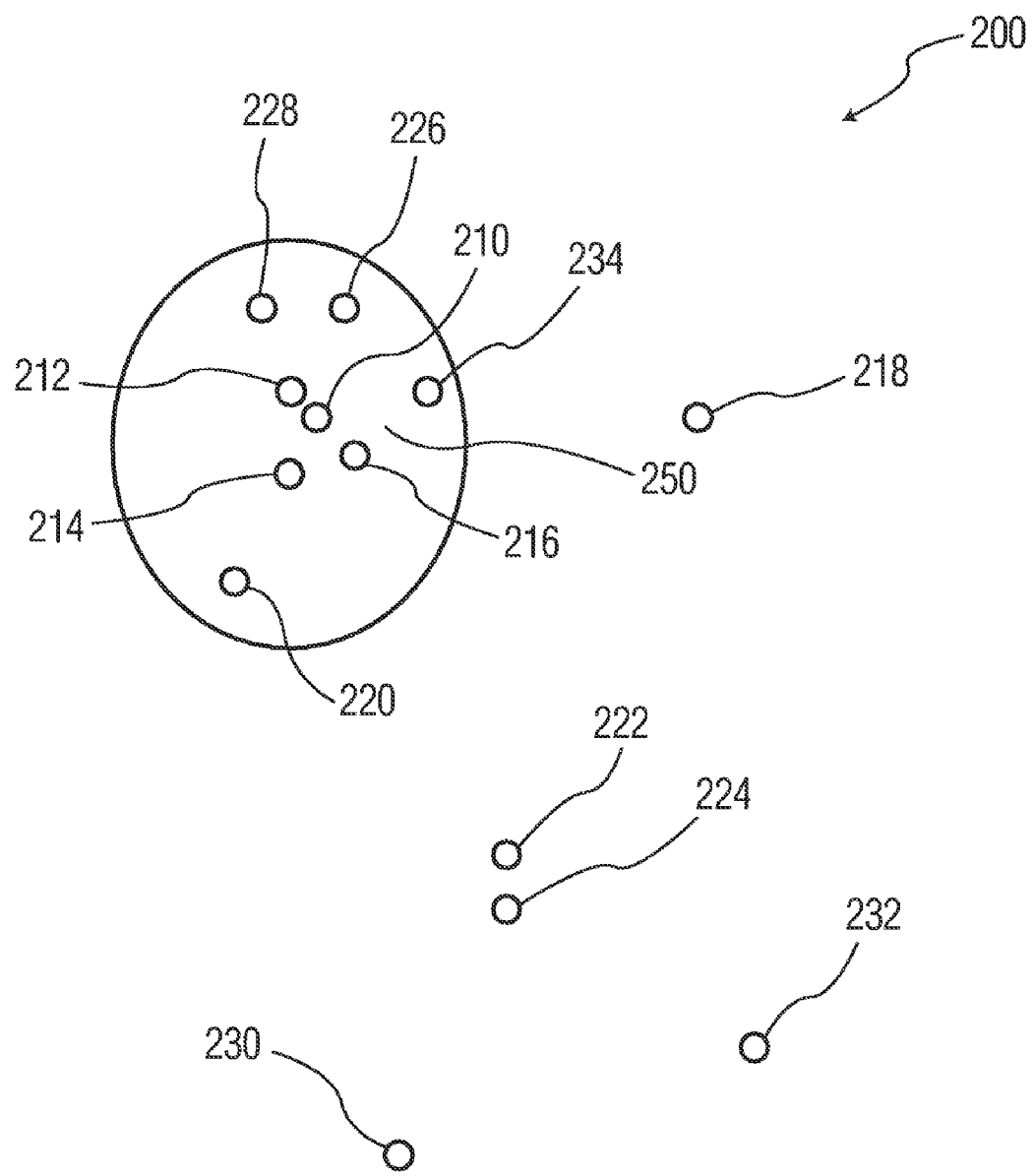
Figure 2D:
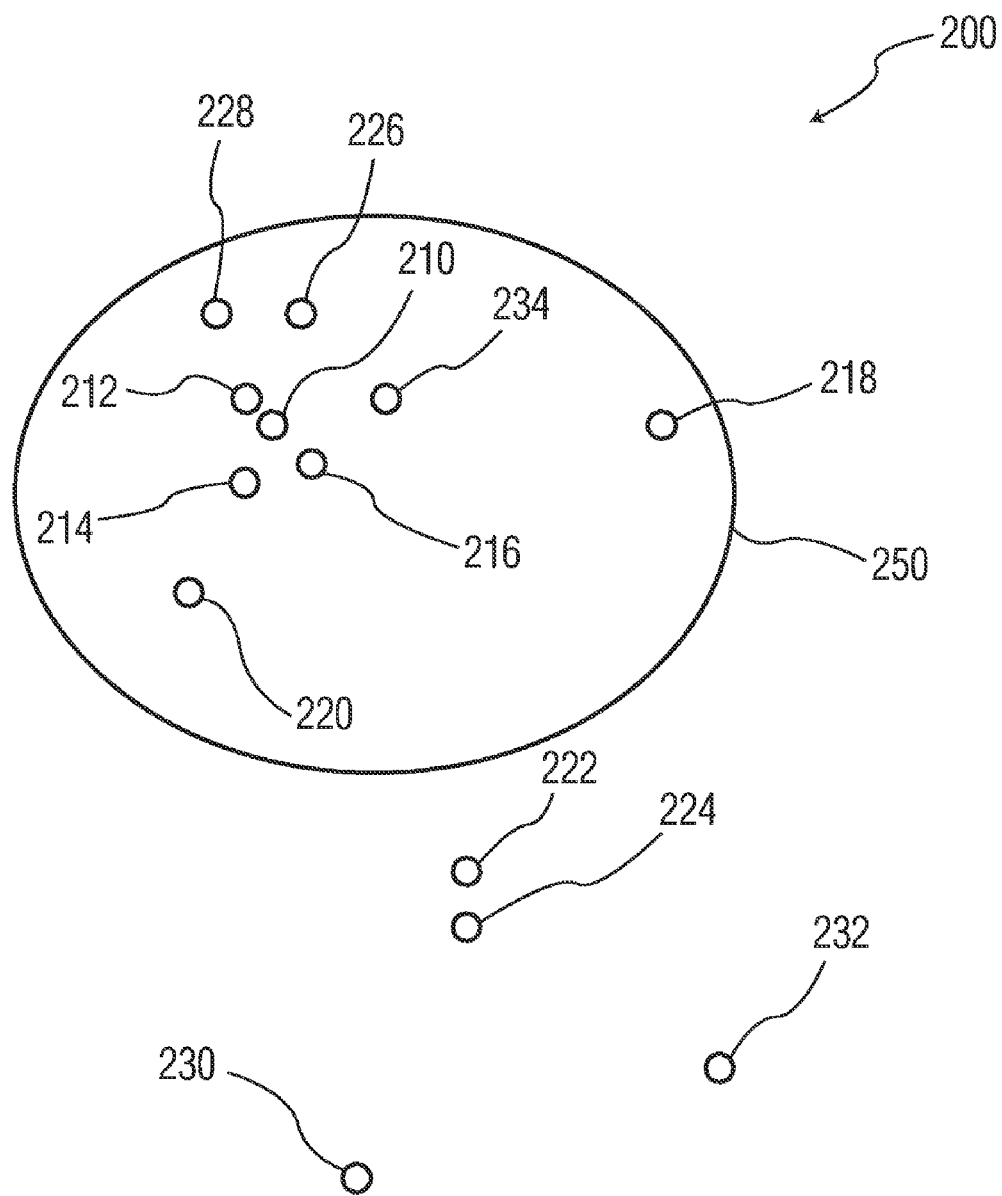

FIG. 2A shows the user interface at a time after a selection activation has exceeded a duration to start growing a selection area 250 (e.g., see, act 340 of FIG. 3). As shown in FIG. 2A, the selection area 250 is substantially round in area similar to the selection area 150 shown in FIGS. 1A, 1B, 1C. However, in accordance with an embodiment, the selection area may grow in any shape, for example and without limitation, the selection area may grow as a circle, oval, rectangle, etc., or the shape may vary as the selection area grows. For example, the selection area may dynamically shape around the selected content items to give a more fluid look and feel as shown in FIG. 2B wherein the selection activation has continued and the selection area 250 has grown to somewhat of an oval shape to encompass content items 228, 226, 234 that are not encompassed in FIG. 2A. Thereafter, as the selection activation continues the shape of the selection area 250 may vary again to encompass a next closest content item 220 as shown in FIG. 2C and content item 218 as shown in FIG. 2D.

The varying shape of the selection area may be related to associations between content items and/or positional relations of content items shown within the user interface. In fact, while in FIGS. 1A-1C and 2A-2D, the selection area is shown to have a shape encompassing content items, this is just shown for illustrative purposes in that the selection area need not have a given single shape encompassing items as long as some visual representation is provided to the user to convey the selection of content items. These and other visual indications are commonly referred to herein as a selection indication.

In another user interface representation of content items, features and characteristics of the content items may be related, as discussed above with regard to the mind map display, yet the content items may not be displayed in close proximity.

In FIG. 1A, content item 118 is shown as being first selected. In one embodiment, other content items that are associated with content item 118 may not be displayed in close proximity to content item 118 yet in accordance with an embodiment, may be selectable without a selection indication visualized as an area growing out in a given shape from an origin at content item 118 or cursor 140. For example, content items 102, 132 may have an association to content item 118 such that content items 102, 132 would be selected after selection of item 118 during act 340 of FIG. 3. In this embodiment, a selection area growing from content item 118 may not be desirable to a user. Accordingly, in this or other embodiments, the section indication may not be illustrated by a selection area but by a change in the visual appearance of a selected content item, such as shown for item 118. Accordingly, the user interface representation of content items 102, 132 may change to indicate selection.

In addition or in place of a change in the visual representation of selected content items, the system may provide some other indication of selected content items. For example and in accordance with an embodiment, the system may provide an indication of selected content items as any one or more of an indication of a total number of selected content items, as an absolute number or an abstract representation, such as a progress bar indicating a relative amount of selected content items (e.g., as a function of a number of selected content items divided by a total number of content items, as a function of a number of selected content items divided by a total storage size available during a move/copy selection operation, etc.), and as a size of content items selected (e.g., 12 bytes and/or 12 bytes out of 20 kilobytes).

In yet another embodiment, the present system after the selection of content items 102, 132, following selection of content item 118, may result in a visual reordering of content items such that content items 118, 102, 132 after selection would be reordered to be in closer spatial proximity, which may act as the indication of selection activation. In this embodiment, as selection activation is continued, the visual representation of content items will reorder continuously or step-wise as the selection indication.

In another embodiment wherein content items that are associated with content item 118 are not displayed in close proximity to content item 118, the content items may be selectable with a selection indication visualized as a selection area growing out in one or more shapes from origins at content items that are more closely related to the first selected content item. For example, content items 102, 104, 134 may have an association to content item 118 that is more closely related than content items 128, 130, 132. In accordance with an embodiment, a selection indication, such as a selection area growing out of content item 102 (a more closely related content item than content items 104, 134) may start during act 340 of FIG. 3. In this embodiment, the selection area may grow from content item 102 to encompass content items 104, 134. Thereafter if the selection activation is continued, a second selection area may start growing at content item 128 and continue to encompass content items 130, 132. While the selection activation continues, next more associated content items may be encompassed by one of the two selection areas, or if desirable or more visually appealing (e.g., next items not in close proximity to the selections area), new selection areas may begin around next more associated content items. In this or other embodiments, a combination of the above selection indications may occur. For example in the above example, after content item 132 is encompassed by the selection area, next more associated content items may be content items 112, 136. In this case, a separate selection area may encompass each individual content item 112 and 136 or another selection indication may occur, for example, such as a similar selection indication as shown for content item 118 in FIG. 1A, although clearly other selection indications may also be desirable.

Each of the above indications of selection activation and others that may be readily applied should be understood to be within the scope of the present invention generally, and should be understood to be encompassed by the term 'growing the selection indication' particularly, and equivalents thereof. Further, any combinations of one or more of any of the above features including particular presentations of content items and selection indications may be utilized. For example, the term selection indication should be understood to encompass these and other ways of indicating a selection to a user including other visual selection indications. Each of the above described ways of providing a presentation of content items and a selection indication, visual or otherwise is intended as illustrations of the present invention. Any other ways should also be understood to be within the scope of the present system.

The embodiments of the invention described above are intended for purposes of illustration only, and should not be construed as limiting the appended claims to any particular embodiment or group of embodiments. Numerous alternative embodiments may be devised by those having ordinary skill in the art without departing from the spirit and scope of the following claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

The claimed invention is:

1. A method for selecting content comprising the acts of:
sensing a duration of time of a selection action of a content item; and
growing a selection indication if the duration of time of the selection action exceeds a given time interval, wherein the act of growing the selection indication comprises the act of sensing a proximity of a content item close to an outside edge of a selection area and growing the selection area at a rate that is determined by the proximity of the content item.

2. A method for selecting content comprising the acts of:
sensing a duration of time of a selection action of a content item; and
growing a selection indication if the duration of time of the selection action exceeds a given time interval, wherein the act of growing the selection indication comprises the act of sensing a proximity of a content item outside a selection area in relation to a content item within the selection area and growing the selection area at a rate that is determined by the proximity.

3. The method as claimed in claim 1, wherein the selection indication is a selection area that originates in an area of the selection action.

4. A method for selecting content comprising the acts of:
sensing a duration of time of a selection action of a content item; and
growing a selection indication if the duration of time of the selection action exceeds a given time interval, wherein the act of growing the selection indication comprises the act of sensing a proximity of a content item outside a selection area and growing the selection area towards the content item.

5. A method for selecting content comprising the acts of:
sensing a duration of time of a selection action of a content item; and
growing a selection indication if the duration of time of the selection action exceeds a given time interval, wherein the time interval is determined by the proximity of a second content item to a first selected content item.

6. A method for selecting content comprising the acts of:
sensing a duration of time of a selection action of a content item; and
growing a selection indication if the duration of time of the selection action exceeds a given time interval,
wherein said method further comprises the act of:
determining an association between a plurality of content items and wherein the selection indication grows based on the association.

7. The method as claimed in claim 6, wherein the act of growing the selection indication comprises the act of repositioning content items to be in close spatial proximity.

8. The method as claimed in claim 6, wherein the act of growing the selection indication comprises the act of presenting a status bar indicating a relative number of selected content items.

9. A device, comprising:
a processor; and
a display, wherein the processor is configured to produce a representation of content items on the display, is configured to sense a duration of time of a selection action of a content item, and is configured to grow a selection indication if the duration of time of the selection action exceeds a given time interval, wherein the processor is configured to sense an association between a plurality of content items and to grow the selection indication at a rate that is determined by the sensed association.

10. A device, comprising:
a processor; and
a display, wherein the processor is configured to produce a representation of content items on the display, is configured to sense a duration of time of a selection action of a content item, and is configured to grow a selection indication if the duration of time of the selection action exceeds a given time interval, wherein the processor is configured to sense a proximity of a content item outside a selection area in relation to a content item within the selection area and configured to grow the selection area at a rate that is determined by the proximity.

11. A device, comprising:
a processor; and
a display, wherein the processor is configured to produce a representation of content items on the display, is configured to sense a duration of time of a selection action of a content item, and is configured to grow a selection indication if the duration of time of the selection action exceeds a given time interval, wherein the processor is configured to determine an association between a plurality of content items and is configured to determine the time interval based on the determined association.

12. A device, comprising:
a processor; and
a display, wherein the processor is configured to produce a representation of content items on the display, is configured to sense a duration of time of a selection action of a content item, and is configured to grow a selection indication if the duration of time of the selection action exceeds a given time interval, wherein the processor is configured to determine an association between a plurality of content items and configured to grow the selection indication based on the association.

13. A device, comprising:
a processor; and
a display, wherein the processor is configured to produce a representation of content items on the display, is configured to sense a duration of time of a selection action of a content item, and is configured to grow a selection indication if the duration of time of the selection action exceeds a given time interval, wherein the processor is configured to reposition content items to be in close spatial proximity as determined by an association between selected content items.

14. A non-transitory computer-readable storage medium having stored thereon a program portion for causing a processor, when loaded with the program portion, to:
produce a representation of content items;
sense a duration of time of a selection action of a content item; and
grow a selection indication if the duration of time of the selection action exceeds a given time interval,
wherein the program portion further causes the processor to use an association between a plurality of content items to grow the selection area at a rate that is determined by the association.

15. A non-transitory computer-readable storage medium having stored thereon a program portion for causing a processor, when loaded with the program portion, to:
produce a representation of content items;
sense a duration of time of a selection action of a content item; and
grow a selection indication if the duration of time of the selection action exceeds a given time interval,
wherein the program portion further causes the processor to reposition content items to be in close spatial proximity based on an association between selected content items.

16. A non-transitory computer-readable storage medium having stored thereon a program portion for causing a processor, when loaded with the program portion, to:
produce a representation of content items;
sense a duration of time of a selection action of a content item; and
grow a selection indication if the duration of time of the selection action exceeds a given time interval,
wherein the program portion further causes the processor to produce a mind map representation of content items, and wherein the program portion further causes the processor to grow the selection indication outward from a position in the mind map representation originating at a position determined from the selection action.

17. A non-transitory computer-readable storage medium having stored thereon a program portion for causing a processor, when loaded with the program portion, to:
produce a representation of content items;
sense a duration of time of a selection action of a content item; and
grow a selection indication if the duration of time of the selection action exceeds a given time interval, wherein the selection indication is a representation of selected items in relation to a total number of content items represented.

* * * * *